3,611,683
ROTARY LAWNMOWER ATTACHMENT
Eskil W. Swenson, Rockford, Ill., assignor to Swenson
 Spreader & Mfg. Co., Lindenwood, Ill.
Filed Mar. 30, 1970, Ser. No. 23,678
Int. Cl. A01d 51/00
U.S. Cl. 56—16.1          11 Claims

ABSTRACT OF THE DISCLOSURE

The attachment includes a horizontal carrier bar mounted at its center to the vertical power output shaft of the rotary lawnmower, in place of the usual cutter blade. A single rake finger is resiliently mounted at one end of the carrier bar for tilting movement both radially and circumferentially of the direction of rotation of the carrier bar. The carrier bar is formed with two edges bent upwardly to retain the resilient mounting means and with a relatively large opening to balance the attachment and prevent buildup between the upwardly bent edges.

BACKGROUND

The invention pertains to improvements in attachments adapted for use with a rotary lawnmower and particularly to an attachment which may be used for mulching or removing thatch from a lawn.

It is considered advantageous that grass, leaves and the like be returned to the soil as mulch. Many lawnmowers are sold with a mulching cover for the housing outlet so that matter is retained in the housing for further reduction by the cutter blade. The cutter blade, however, is spaced a distance from the ground (for example about 2") and at least some of the matter below that level is not effectively mulched. It is desirable, therefore, to provide an apparatus capable of mulching matter that lies close to the ground.

In lawn maintenance, it is desirable to remove the dry, dead "thatch" that lies close to the ground surface. This operation is usually performed in the spring to prevent the thatch from inhibiting the new growth. The thatch may be removed by vigorous hand raking or a power rake. However, such hand raking is both time consuming and tiring; and a power rake is expensive even to rent. It is desirable, therefore, to provide a relatively inexpensive apparatus capable of removing thatch from a lawn.

SUMMARY

The present invention relates to improvements in lawn care apparatus and more particularly to an attachment for a rotary lawnmower which is useful for mulching, dethatching, and like operations.

It is a primary object of the present invention to provide a mulching or dethatching attachment which may be applied to an ordinary rotary lawnmower.

Another object is to provide a rotary lawnmower attachment which includes a depending rake finger which is resiliently mounted for tilting movement both radially and circumferentially of the direction of rotation of the carrier bar.

Still another object is to provide a rotary lawnmower attachment which includes a single rake finger at one end, which is mounted at the geometric center of the carrier bar, and which has a carrier bar shaped so that the center of gravity of the entire attachment is at said geometric center.

Another object of the present invention is to provide a rotary lawnmower attachment in which the carrier bar is shaped to provide retention of mounting means for the rake finger.

Yet another object is to provide a rotary lawnmower attachment in accordance with the foregoing object and which is shaped to prevent buildup of matter on the carrier bar.

These, and other objects and advantages of the invention, will be apparent as the invention becomes better understood from the following detailed description when taken in conjunction with the drawings.

DRAWING

DESCRIPTION

Figure 1:
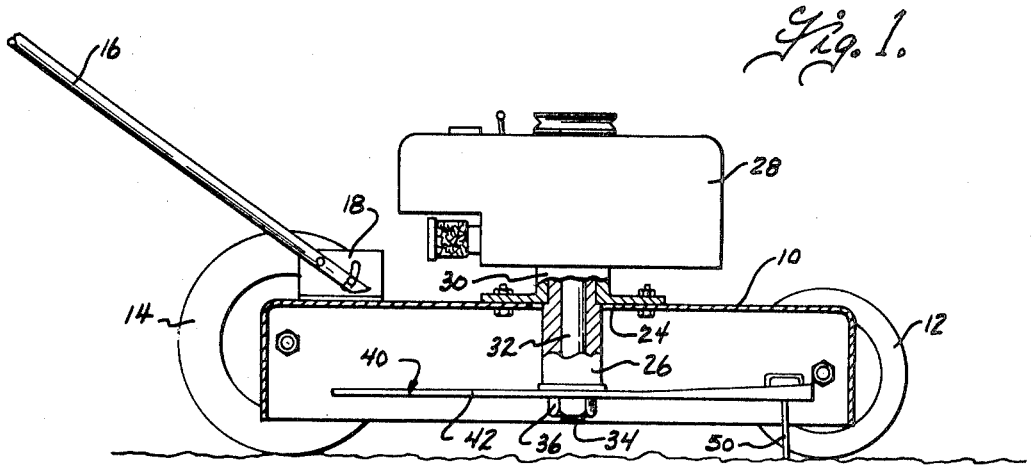
FIG. 1 is a view, part in section and part in elevation, of a rotary lawnmower having the present invention mounted thereon.

Reference is now made more particularly to the drawing wherein the same numerals indicate the same parts throughout the several views.

The rotary lawnmower shown, for the purpose of illustration, includes a housing 10 having an open lower end and supported on a pair of forward wheels 12 and rear wheels 14. The lawnmower is provided with a handle 16 conveniently mounted on housing 10 by brackets such as at 18. The top of housing 10 has an opening 24 for the passage of a downwardly extending drive shaft housing 26 of a conventional engine 28. The engine is mounted on a bearing flange 30 which is bolted to the top surface of the housing 10, as shown. A drive shaft, or power output shaft 32 extends downwardly within the housing 26 and terminates in a threaded portion 34.

The attachment forming the subject matter of the present invention is indicated generally by the numeral 40 and is adapted to be mounted on drive shaft 32 in place of the usual cutter blade. The attachment includes a horizontal carrier bar 42 which is initially formed from a rectangular steel bar of uniform width and thickness. Carrier bar 42 has an opening 44 at the geometrical center of the rectangular steel bar for passage of the drive shaft 32. A nut 36 (see FIG. 1) is threaded on end 34 to mount the carrier bar 42 on the drive shaft 32 for rotation therewith. As can be seen in FIG. 1, when so mounted the carrier bar 42 is spaced above ground level. A pair of identical elongate openings 45 are provided one on either side of opening 44, to accommodate positioning pins which are provided on some rotary lawnmowers.

Figure 2:
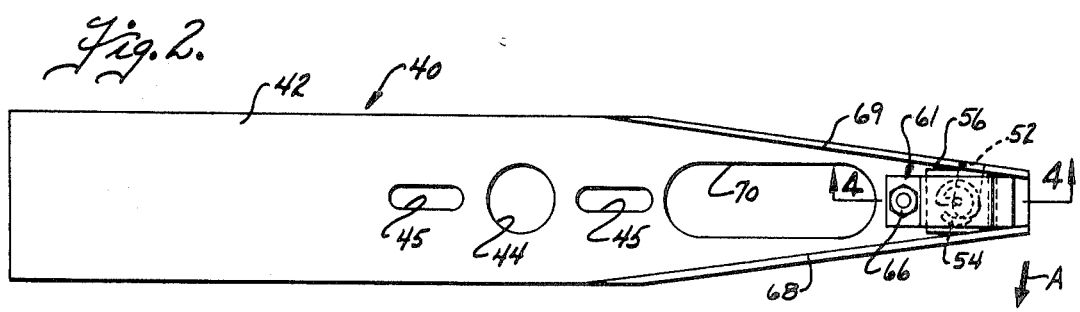
FIG. 2 is a top view of a preferred embodiment of the attachment of the present invention.

A rake finger 50 is preferably mounted at only one end of carrier bar 42 and depends to a point adjacent the ground (see FIG. 1). The carrier bar 42 has an opening 52 for passage of the rake finger 50 and the opening 52 is canted in a direction radially outwardly, and rearwardly of the direction of rotation indicated by arrow A (FIG. 2) for a purpose hereafter explained. Rake finger 50 has an enlarged head portion 54 at its upper end. In the embodiment illustrated, the rake finger is formed of a rod of spring steel and the enlarged head portion is provided by shaping the upper end of the rod in a generally circular shape, best shown in FIG. 2.

Figure 3:
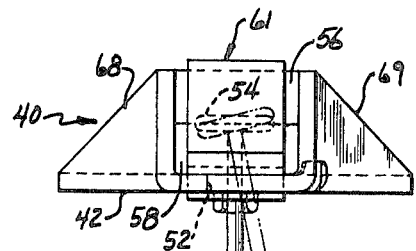
FIG. 3 is a large scale end view as seen from the right in FIG. 2.
Figure 4:
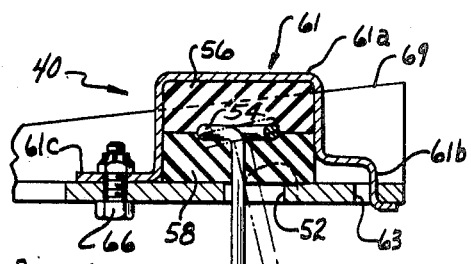
FIG. 4 is a large scale, partial sectional view taken generally along line 4—4 of FIG. 2.

Means is provided for mounting the rake finger 50 and resiliently supporting the rake finger for tilting movement both radially and circumferentially of the direction of rotation of the bar 42. For this purpose, upper and lower rubber blocks 56 and 58 are provided on either side of the head 54 of the rake finger. The lower block 58 has an opening for passage of the depending portion of the rake finger, as best seen in FIG. 4. A bracket 61 is provided for holding the blocks contiguous to each other and for mounting the same with the lower block 58 contiguous to the bar 42. In this manner, the rake finger 50 is resiliently mounted for tilting movement radially of the carrier bar 40 as shown in phantom in FIG. 4. Such tilting movement may be caused by centrifugal force acting on the rake finger 50. The resilient mounting minimizes stresses in the rake finger 50 and eliminates wear which occurs when it is supported against such radial tilting movement. The resilient mounting also supports the rake finger 50 for tilting movement circumferentially of the direction of rotation of the carrier bar 40 as shown in phantom in FIG. 3. Such tilting may be caused by contact with an obstruction on the ground, for example. To accommodate these two tilting movements, or the combination thereof, the opening 52 is canted in a manner previously described.

In the embodiment shown, bracket 61 includes an inverted U-shaped portion 61a engaged with the outer and innermost edges of the blocks and with the top of the outer block 56, as best shown in FIG. 4. Carrier bar 42 is provided with an opening 63 adjacent the outer end of the bar and adjacent one leg of the U-shaped portion 61a. As can be seen, the outermost end of bracket 61 is in a generally Z-shape, indicated at 61b, to pass through the opening 63 and underlie a portion of the carrier bar 42. A flange 61c is provided at the end of the other leg of the U-shaped portion 61a, and a fastener 66 is provided for attaching the flange 61c to the carrier bar 42. In the embodiment illustrated, the fastener 66 includes a bolt with a lock nut thereon. In this manner, the resilient rubber blocks 56 and 58 support the rake finger 50 for the aforementioned radial and circumferential tilting movement.

The carrier bar 42 is preferably formed from a rectangular elongate member of initially uniform width and thickness and mounted on the power output shaft 32 at the geometric center of the member. In its preferred form, the carrier bar 42 has its two edges 68 and 69 bent upwardly adjacent the end of the bar on which the rake finger 50 is mounted. In the embodiment illustrated, the edges 68 and 69 are bent upwardly to an angle of 90° from the horizontal. This shape provides a triple function, as follows: (1) it provides a housing to retain the rubber blocks 56 and 58 therebetween, (2) it strengthens the bar 42 at its working end and (3) it provides an air turbulence to suck matter upwardly from the ground level. As can be seen, with the cooperation of the edges 68 and 69, the bracket 61 does not need to completely house the rubber blocks 56 and 58.

A relatively large opening 70 is provided in bar 42 between the upwardly bent edges 68 and 69, and also between the rake finger 50 and the central opening 44. The relatively large opening 70 is sized to remove enough material to counterbalance the rake finger 50, blocks 56 and 58, bracket 61, and fastener 66, so that the center of gravity of the entire assembly 40 is at the geometric center of carrier bar 42. Additionally, opening 70 prevents buildup of matter between the upwardly bent edges 68 and 69 so that the assembly will not become unbalanced by reason of any accumulation. Outwardly of opening 70, the bracket 61 and rubber blocks 56 and 58 effectively fill the area between the upwardly bent edges so that matter does not accumulate at that point. Outwardly of bracket 61, any matter will be discharged by centrifugal force.

A salient feature of the attachment is that a single rake finger 50 is mounted at only one end of the carrier bar 42. In this manner, the motor of an ordinary rotary lawnmower has sufficient power to rotate the attachment efficiently and effectively. Preferably, the attachment 40 is balanced as by removal of a large area, which results in opening 70, to thereby provide the center of gravity of the attachment at the geometric center of the original elongate member.

It is now deemed apparent that the rotary lawnmower attachment of the present invention can be used for thatching a lawn or mulching matter on the ground. The attachment can be applied to an ordinary rotary lawnmower and includes a rake finger which is resiliently mounted for tilting movement both radially and circumferentially of the direction of rotation of the carrier bar. The carrier bar 42 is shaped to provide a partial housing for the mounting means for the rake finger, and is also shaped to prevent buildup of matter on the carrier bar.

The embodiments of the invention in which an exclusive property or privilege is claimed are defined as follows:

1. An attachment for use with a rotary lawnmower including a wheeled housing having an open bottom and carrying a prime mover having a vertically downwardly extending power output shaft, said attachment comprising: a horizontal carrier bar mounted on the power output shaft for rotation therewith and spaced above the ground level; a rake finger at one end of the carrier bar and depending to a point adjacent the ground; the rake finger having an enlarged head portion adjacent the carrier bar; an upper resilient block overlying the head portion; a lower resilient block underlying the head portion and having an opening therethrough for passage of the rake finger; said blocks resiliently supporting the rake finger for tilting movement both radially and circumferentially of the direction of rotation of the carrier bar; and a bracket for holding the blocks contiguous to each other and for mounting the same with one block contiguous to the carrier bar.

2. A rotary lawnmower attachment as set forth in claim 1 wherein the carrier bar has an opening therethrough for the passage of the rake finger, the blocks are on the upper side of the carrier bar with the lower block contiguous thereto, and the bracket is generally an inverted U-shape engaged with two sides of the blocks and the top of the upper block.

3. A rotary lawnmower attachment as set forth in claim 2 wherein the carrier bar has a slot therethrough adjacent the end of one leg of the U-shape of the bracket; and the bracket includes a first outwardly extending portion at the end of said one leg and adapted for passing through the slot and underlying the carrier bar, a second outwardly extending portion at the end of the other leg of the U-shape of the bracket and overlying the carrier bar, and a fastener for attaching the second outwardly extending portion to the carrier bar.

4. A rotary lawnmower attachment as set forth in claim 1 wherein the carrier bar has the rake finger mounted only at one end thereof, the carrier bar is formed from an elongate member of initially uniform width and thickness and mounted on the power output shaft at the center of the member; the elongate member having its two edges adjacent said one end bent upwardly to retain the last-mentioned means therebetween, and the elongate member having a relatively large opening located between the upwardly bent edges and between the rake finger and the center to balance the attachment so the center of gravity is at said center and to prevent buildup of matter between the upwardly bent edges.

5. An attachment for mounting on the power output shaft of a rotary lawnmower and comprising: a horizontal carrier bar adapted for mounting on the power output shaft for rotation therewith; a depending rake finger at one end of the carrier bar; a member of resilient material having an opening therein for passage of the rake finger; the member resiliently supporting the rake finger for tilting movement both radially and circumferentially of the direction of rotation of the carrier bar; a bracket engaged with the resilient member and the carrier bar for holding the resilient member and rake finger in position at the one end of the carrier bar; the bracket including a generally U-shaped portion, the legs of which engage the inner and outer sides of the resilient member; and the carrier bar being formed from an elongate member of initially uniform width; said elongate member having its two edges adjacent said one end bent at about 90° from their initial position to retain the lateral sides of the resilient member therebetween.

6. A rotary lawnmower attachment as set forth in claim 5 wherein the carrier bar has an opening therethrough for passage of the rake finger, the resilient member is on the upper side of the carrier bar, and said two edges of the elongate member are bent upwardly.

7. A rotary lawnmower attachment as set forth in claim 6 wherein the elongate member has an opening at its geometric center for mounting on the power output shaft, and a relatively large opening located between the center opening and the rake finger and between the upwardly bent edges for balancing the attachment so the center of gravity is at said geometric center and for preventing buildup of matter between the upwardly bent edges.

8. A rotary lawnmower attachment as set forth in claim 7 wherein the rake finger has an enlarged head portion at the upper end thereof; the resilient member includes first and second rubber blocks, one on either side of said head portion to retain the same therebetween and support the rake finger for said radial and circumferential tilting.

9. An attachment for use with a rotary lawnmower including a wheeled housing having an open bottom and carrying a prime mover having a vertically downwardly extending power output shaft, said attachment comprising: a horizontal carrier bar mounted on the power output shaft for rotation therewith and spaced above the ground level; a single rake finger at only one end of the carrier bar and depending to a point adjacent the ground; mounting means engaged with the rake finger and the one end of the carrier bar for mounting the rake finger thereon; the carrier bar being formed from an elongate member of initially uniform width and thickness and mounted on the power output shaft at the geometric center of the member; and the elongate member having a relatively large opening between the mounting means and the center of the member to balance the attachment so that the center of gravity is at the geometric center of the member.

10. The combination of claim 9 wherein the elongate member has its two edges adjacent said one end but at about 90° from their initial position to retain the mounting means therebetween.

11. The combination of claim 10 wherein the mounting means includes a resilient member supporting the rake finger for tilting movement and retained between the bent edges of the elongate member, and the mounting means also includes a bracket which engages the inner and outer sides of the resilient member.

References Cited

UNITED STATES PATENTS

| | | | |
|---|---|---|---|
| 3,184,903 | 5/1965 | Fjelstad | 56—25.4 |
| 3,226,922 | 1/1966 | Luther et al. | 56—400 |

ROBERT PESHOCK, Primary Examiner